(12) United States Patent
Dawson et al.

(10) Patent No.: US 8,776,493 B1
(45) Date of Patent: Jul. 15, 2014

(54) LIGHTWEIGHT ELECTRIC GENERATOR USING HYDROGEN AS A FUEL

(75) Inventors: David C. Dawson, Lemon Grove, CA (US); Richard C. Adams, Chula Vista, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 493 days.

(21) Appl. No.: 13/079,986

(22) Filed: Apr. 5, 2011

(51) Int. Cl.
*F02C 3/14* (2006.01)
(52) U.S. Cl.
USPC .......................... 60/39.34; 60/39.35; 123/200
(58) Field of Classification Search
USPC .............. 60/39.34, 39.35; 123/200, 210, 212, 123/214
See application file for complete search history.

(56) References Cited

U.S. PATENT DOCUMENTS

| | | | | |
|---|---|---|---|---|
| 7,938,097 | B2 * | 5/2011 | Sparling | 123/200 |
| 8,117,824 | B1 * | 2/2012 | Adams et al. | 60/39.34 |
| 2009/0169446 | A1 * | 7/2009 | Amendola et al. | 422/234 |

OTHER PUBLICATIONS

J. E. Shepherd 1986, "Chemical Kinetics of Hydrogen-Air-Diluent Detonations", Progress in Astronautics and Aeronautics 106, Caltech, 263-293 (1986).
Simpson, "Unraveling the Mystery of Detonation", Science & Technology Review, Lawrence Livermore Laboratories (Jun. 1999).

* cited by examiner

*Primary Examiner* — Thomas Denion
*Assistant Examiner* — Thomas Olszewski
(74) *Attorney, Agent, or Firm* — SPAWAR Systems Center Pacific; Kyle Eppele; J. Eric Anderson (57) ABSTRACT

A prime mover uses detonation chambers to provide rotary power through a center hub. The center hub has a center shaft able to rotate and mounted to the center hub, and rotating arms are mounted to the center shaft. A detonation chamber is mounted to each rotating arm at a distance from the center hub which establishes a force moment about the center hub. Fuel passages connect an external fuel source, such as hydrogen and oxygen, with the detonation chambers to deliver fuel to the detonation chambers. Fuel delivered to the detonation chambers is ignited to establish a reaction force which is transferred through the rotating arms and the center hub. The rotating force is used to drive a generator.

13 Claims, 6 Drawing Sheets

LIGHTWEIGHT ELECTRIC GENERATOR USING HYDROGEN AS A FUEL

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100591.

BACKGROUND

This disclosure relates to prime movers, including vehicle propulsion systems that use hydrogen as a fuel. A lightweight and compact engine to use hydrogen to generate electricity is described.

SUMMARY

A prime mover has a shaft which is able to rotate, and mounted to a center hub, and one or more rotating arms mounted to the center shaft. A detonation chamber is positioned on each of the arms and is provided with fuel by a set of fuel passages connecting an external fuel source with the center hub and to the detonation chambers in order to deliver fuel to the detonation chambers. The fuel passages include a fuel interface at the center hub connecting the fuel passages from the external fuel source with corresponding fuel passages connecting the center hub to the detonation chambers. An ignition source is timed to cause detonation of the fuel delivered to the detonation chambers. The rotating arms are mounted to the center hub in a manner that balances moments of force about the center hub exerted by the rotating arms during rotation of the swing rotating arms.

BRIEF DESCRIPTION OF THE DRAWING

FIG. 6 shows the results for rotation rate and FIG. 7 shows the results for power.

DETAILED DESCRIPTION

This disclosure relates to a light-weight and compact engine to use hydrogen to generate electricity. The device is applicable to methods to generate electricity in a submarine for life support systems and other uses.

Figure 3A:
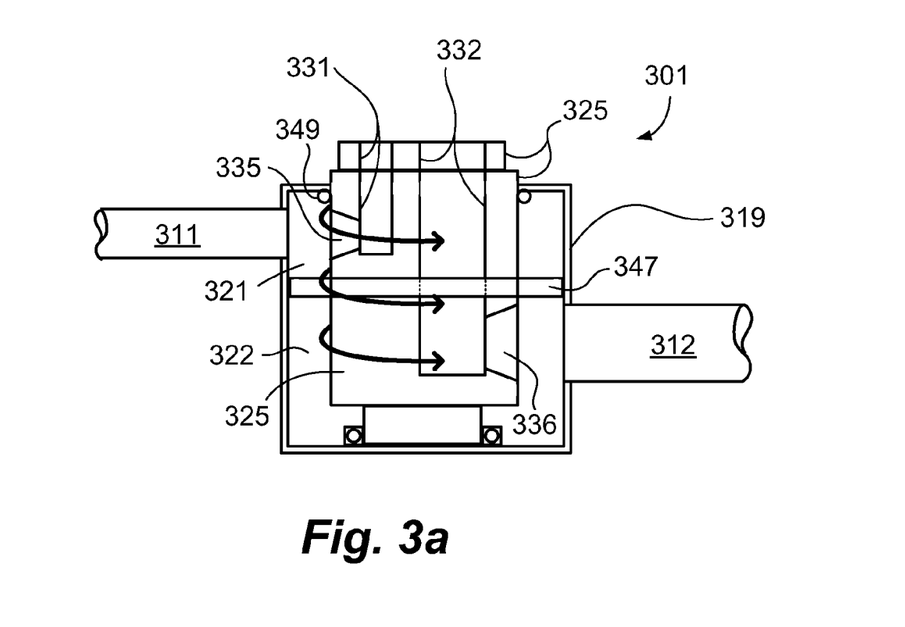
FIGS. 3a and 3b are schematic diagrams describing the interface between the fuel supply connections and the rotating portion of the engine. The two figures show the rotation of a center hub extension.
Figure 3B:
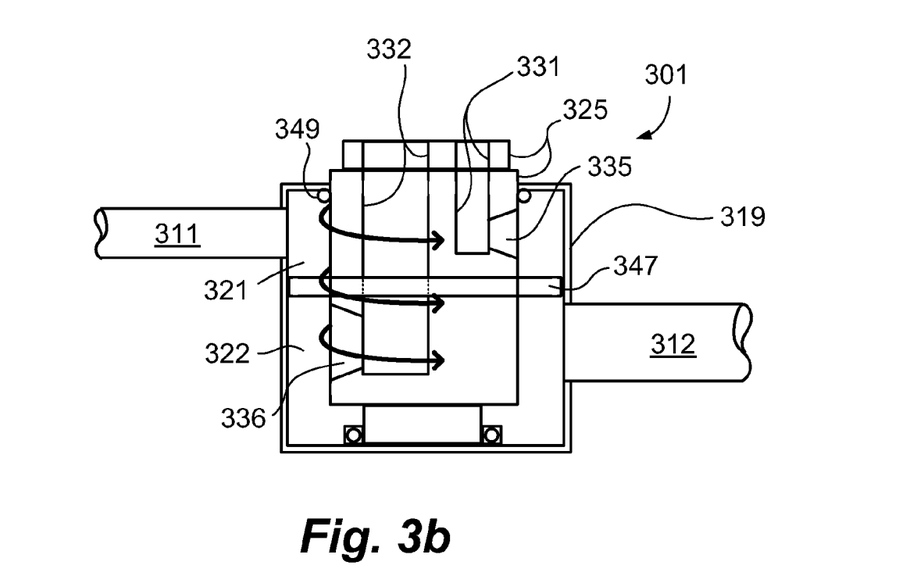

A propulsion system includes a rotating arm that rotates around a hollow axle. The rotating arm is formed with a detonation chamber at each end, an opening and tubular ducts to establish a path of fluid communication between the detonation chamber and the opening. The axle is inserted into the opening to establish an axis of rotation for the rotating arm around the axle. At least one hole is formed in the axle to selectively establish a path of fluid communication between the fuel delivery chamber of the axle and the detonation chambers in the rotating arm. This occurs constantly during the rotation of the axle due to the stationary interface of FIG. 3.

The disclosed technique can further include the steps of delivering hydrogen and importing oxygen into the engine detonation chamber. As the oxygen and hydrogen mixture is detonated, the resulting chemical energy is converted into mechanical energy. The resulting by-product of the detonation is water in vapor form which can be collected from the rotating arm enclosure by a vacuum pump or other various means. Hydrogen and oxygen are described by way of non-limiting example, and different fuels may be used to provide chemical energy for conversion to mechanical energy; however, these two gases provide the pollution-free feature that makes the described techniques attractive.

As described herein, all components of the exothermic reaction of combustion or detonation are considered fuels. Thus, while oxygen is considered an oxidizer, it is also a fuel of combustion because it combines with another fuel to produce energy.

Submarines use diesel engines for both the generation of electricity and a backup source of power. The diesel engines have disadvantages in that they are heavy, emit noxious exhaust, and require the use of either fossil fuels or fuels that consume agricultural resources. The diesel engine must be heavy because there are extreme temperature changes at a place in which there must be precise machining. The cylinders in which pistons move up and down are the locations for combustion. To maintain the precise machining there must be oil for lubrication, water and/or air for cooling, and mass to conduct heat away from the cylinders. The required size is an especially difficult impediment for a submarine for which space is a premium.

Additionally, the diesel engine also produces a significant acoustic signature that renders the submarine detectable by sonar and classifiable. In contrast, the proposed engine, which requires no regular detonation rate and can be made to detonate randomly, producing an indistinguishable natural-like noise.

An example of a diesel engine used for submarines is a Colt-Pielstick-PA6B-8L model engine, manufactured by Fairbanks Morse. The PA6B-8L is an eight cylinder diesel which generates at a steady rate 3755 SAE HP (2800 kW) of power at a rotation speed of 900 rpm. The dimensions are 7.7 m×5.9 m×3.6 m, weighing 38,000 kg.

There is a range of pressure and temperature at which hydrogen and oxygen detonate rather than combust. The hydrogen and oxygen are delivered to the detonation chamber at a pressure and temperature that emphasize the detonation versus combustion when the mixture is ignited. Each detonation chamber can include a spark plug, igniter or other ignition device that is selectively ignited to detonate the hydrogen/oxygen gas mixture in the detonation chamber. A typical time scale for the completion of the ignition is $1\times10^{-6}$ seconds. The time of detonation, however, can be made random if tactically required.

The detonation of the hydrogen and oxygen mixture will be explosive in character. Under certain conditions of pressure and temperature, the explosion will form a detonation wave. The detonation wave forms a shock wave that will propagate toward the closed ends of the chambers. The shock wave leaves in its wake a highly compressed gas that moves at a speed comparable to the speed of sound. Both the shock and the wake import a significant amount of momentum to the closed end of detonation chamber. From the Huguenot relations and the assumed adiabatic index of hydrogen (gamma=1.4 due to the diatomic character of both hydrogen and oxygen), the fluid in the wake of the shock most likely moves at a speed 5/6 of the speed of the shock. Because the chambers are at the end of arms at whose center is an axis, the momentum imposed upon detonation chambers will start or accelerate rapid rotation of the rotation arm.

It is possible that there will be instabilities in the front of the shock wave, but any instability probably will not form rapidly enough before the detonation wave hits the ends of the cylindrical chambers. Momentum will be transferred to rotating arm to cause rotation in one direction.

Detonation of the hydrogen and oxygen mixture in a detonation chamber as described above will cause water vapor by-products. The water vapor that moves to the direction of the closed end of the cylindrical chamber will be reflected. The motion of the rotating arm will cause water vapor molecules to exit the detonation chambers at the exhaust opening. The explosion of hydrogen and oxygen can be timed (by manipulating the timing of the spark plug) so that 99% of the water vapor exits the detonation chamber before the next detonation.

The present technique uses hydrogen as a fuel, which is combined with oxygen to provide rotational power. In one configuration, the rotational power is used to power an electric generator. All the major components that come in contact with hydrogen may be made of stainless steel or of another corrosion-resistant material.

The hydrogen is obtained by mixing water, such as sea water, with a fairly benign powder composed of sodium borohydride in the presence of a catalyst. The use of the catalyst greatly increases the rate at which hydrogen is produced. Two catalysts, ruthenium tri-chloride and rhodium cause 50% of the hydrogen to be released within 18 seconds of the water touching the powder. In experimental results, 95% of the hydrogen in the sea water was released within 29 seconds due to the action of the ruthenium catalyst.

When used in a submarine, oxygen may be brought into the submarine by means of a snorkel drawing air from above the water. The exhaust material from the detonation of hydrogen and oxygen is water vapor which can also be converted to droplets of water, which are potable and can be used for crew consumption. The technique has advantages in that the generator is much smaller and weighs much less than a comparable diesel generator. The engine can be used as a prime mover to provide electrical energy through a generator or may be used with another power transmission apparatus.

The primary reason for the small size and mass of the hydrogen-powered generator is that the explosions powering the cycle are located in a place in which precision machining is unimportant. The design optimizes the amount of torque delivered with each explosion, which increases efficiency.

Figure 1:
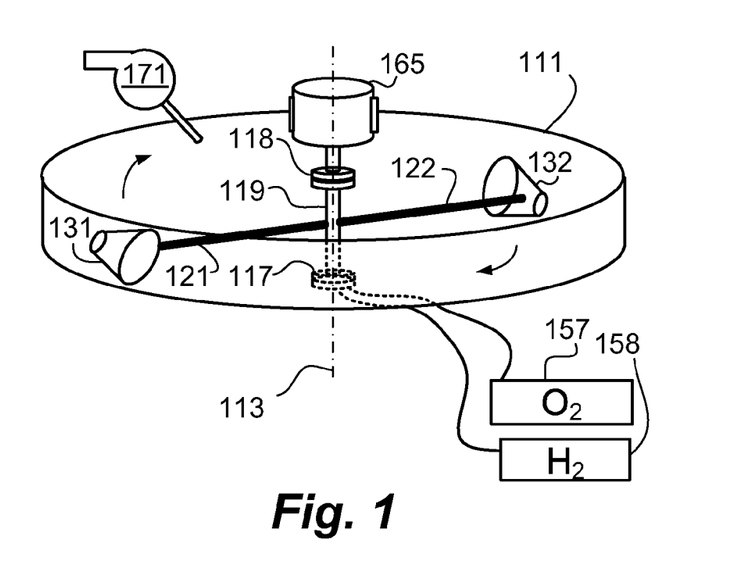
FIG. 1 is a schematic diagram presenting an external view of the engine connected to an electric generator.
Figure 2:
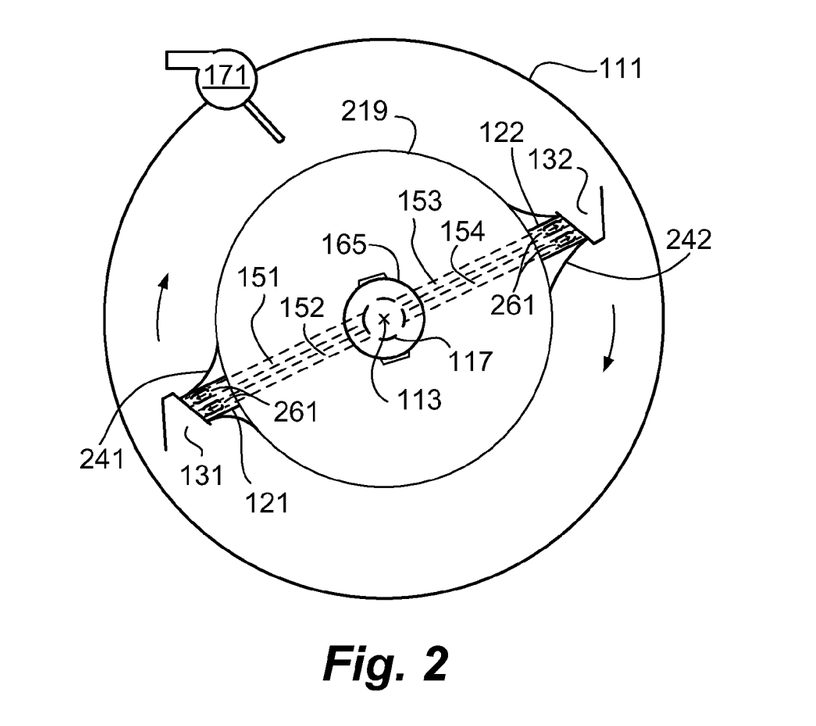
FIG. 2 is a schematic diagram showing the functional operation of the engine of FIG. 1 in an axial view.

The configuration of an example engine is depicted in FIG. 1, which presents an external view of the engine connected to an electric generator. FIG. 2 is an axial view showing the functional arrangement of the engine. If an edgewise view of the engine depicted FIG. 1 is considered a side view, then FIG. 2 would be a top view.

Referring to FIGS. 1 and 2, the engine includes cylindrical enclosure 111, which is an enclosed platform. Cylindrical enclosure 111 has central axis 113 and hub 117, 118, mounted to cylindrical enclosure 111. Alternatively, hub 117 can be mounted on a deck below cylindrical enclosure 111.

Rotating center shaft 119 (FIG. 1) is coupled to hubs 117, 118. A plurality of rotating arms or swing carriers 121, 122 mounted to rotating shaft 119 and detonation chambers 131, 132 carried by rotating arms 121, 122. Rotating shaft 119 is fitted into cylindrical enclosure 111 so as to allow rotating arms 121, 122 to rotate with rotating shaft 119 along with detonation chambers 131, 132. The rotation is such that detonation chambers 131, 132 are near the outer circumference of rotation, within cylindrical enclosure 111.

Rotating shaft 119 is depicted in FIG. 1 as narrow for simplicity of depiction; however, it is possible to provide shaft 219 with a more substantial radius, as depicted in FIG. 2. Additionally, rotating arms 121, 122 can be supported by support extensions 241, 242, also as depicted in FIG. 2.

FIG. 2 shows the support of detonation chambers 131, 132 on rotating arms 121, 122. Detonation chambers 131, 132 are open on one side so that combustion or explosive reaction within detonation chambers 131, 132 cause a reactive force away from the open side, as indicated by the curved arrows. Detonation chambers 131, 132 are fixed to arms 121, 122, which are in turn fixed to center shaft 119. Shaft 119, arms 121, 122 and detonation chambers 131, 132 can be fabricated as discrete components or from a single billet, forging or casting.

In the depicted example, rotating arms 121, 122 are depicted as a pair of rotating arms, forming a single arm. This is the simplest layout, although it is also possible to use a single arm counterbalanced across shaft 119. It is possible to form the engine with more than two arms, much as it is possible to construct a propeller with more than two blades. It is also possible to position multiple sets of arms axially separated along the center shaft in either a single rotation or in a counter-rotating arrangement.

Shaft 119 or 219 and rotating arms 121, 122 have separate passages 151-154 through which hydrogen and oxygen from fuel supplies, represented at 157, 158, flow to detonation chambers 131, 132. Shaft 119 or 219 thereby provides the means for transferring gas to detonation chambers 131, 132 (through rotating arms 121, 122) and for transferring angular momentum from detonation chambers 131, 132 (also via rotating arms 121, 122) to shaft 119.

Check valves 261 (FIG. 2) are used to prevent backflow of the fuels through conduits 151-154 in response to detonation pressures. Check valves 261 may be controlled by fluid flow in a conventional manner or may be responsive to fluid flow and to external pressure from the detonations within enclosure 111. Check valves 261 can also be controlled electronically.

Conduits 151-154 inside rotating arms 121, 122 therefore transfer the hydrogen and oxygen gas from shaft 119 or 219 to detonation chambers 131, 132 at the ends of rotating arms 121, 122. The gases mix within the detonation chamber. Spark plugs (not shown), mounted to detonation chambers 131, 132 ignite the gases, causing detonation, which is used to provide the power to rotate shaft 119 or 219.

The exhaust of the detonation is water vapor which can be condensed into water for later use. A vacuum pump, represented at 171, evacuates cylindrical enclosure 111 in which rotating arms 121, 122 rotate. The vacuum in cylindrical enclosure 111 reduces drag by drawing air and water vapor out of the chamber.

When the hydrogen and oxygen are detonated, the explosion transfers momentum to detonation chambers 131, 132. The transfer of momentum causes rotating arms 121, 122 and detonation chambers 131, 132 to rotate at high speed with respect to cylindrical enclosure 111. The rotation of rotating arms 121, 122 results in angular momentum, which can be transferred to electric generator 165. Shaft 119 or 219 thereby transfers this angular momentum to electric generator 165.

Detonation chambers 131, 132 are configured to accept the two gases through the separate passages 151, 152 or 153, 154, but which allow the hydrogen and oxygen to mix at the detonation chamber.

Detonation chambers 131, 132 can be made of any convenient material which will withstand the heat and shock of detonation, and which will resist corrosion from exposure to the explosion. A non-limiting example of such a material would be stainless steel.

As shown in FIG. 1, rotating shaft 119 or 219 is coupled through output bearing hub 118 to provide output power, such as electric generator 165. Hub 117 forms part or all of the support for rotating shaft 119, 219. Hub 117, which provides oxygen and hydrogen used in detonation may also be used to provide output power.

FIGS. 3a and 3b present a description of a fuel receiving interface coupling 301 which forms a connection between rotating shaft 119 or 219 and an external fuel supply, represented by fuel supply passages 311, 312. Fuel passages 311, 312 pass through a stationary outer housing 319 of fuel receiving coupling 301 and enter first and second chambers 321, 322. Rotating hub extension 325 extends into first and second chambers 321, 322 within stationary outer housing 319.

Rotating hub extension 325 has fuel receiving passages 331, 332, which open at openings 335, 336. Openings 335, 336 are positioned in rotating hub extension 325 so as to be located in stationary outer housing in a manner that aligns openings 335, 336 with first and second chambers 321, 322, respectively. Annular interface seal 347 fits between stationary outer housing 319 and rotating hub extension 325 and engages housing 319 and rotating hub extension 325 to create a seal extending between housing 319 and rotating hub extension 325, thereby separating first and second chambers 321, 322.

The configuration is such that fuel receiving passage 331, first chamber 321, and opening 335 are in communication. Likewise, fuel receiving passage 332, second chamber 322, and opening 336 are in communication. The separation of chamber 321 and 322 by annular interface seal 347 isolates fuel passing from fuel passages 311 and 331 to fuel passages 312 and 332. In addition, shaft seal 349 is used to contain fuel within chamber 321. The interface seal 347 and bottom wall of stationary outer housing 319 seal chamber 322. The fluid communication between fuel supply passages 311, 312 and the respective fuel receiving passages 331, 332 is maintained during rotation of hub extension 325, as is shown in the two views represented by FIGS. 3a and 3b.

Fuel receiving coupling 301 is depicted as separate from hub 117; however, it is possible to integrate the functions of hub 117 and fuel receiving coupling 301. In the case of fuel receiving coupling 301 being separate from hub 117 as shown, fuel receiving interface coupling 301 may optionally provide additional physical support for rotating shaft 119 or 219.

Rotating hub extension 325 forms a part of rotating shaft 119 or 219. Fuel receiving passages 331, 332 are in communication with separate passages 151, 152 or 153, 154 (FIG. 2), in which fuel receiving passage 331 communicates with passages 151 and 153, and the other fuel receiving passage 332 communicates with passages 152 and 154. This arrangement provides separate fuel supplies to detonation chambers 131, 132. The gas, still under pressure, then goes through the passages 151-154 to detonation chambers 131, 132. Shaft 119 or 219 at the top of the interface transfers angular momentum from the engine to electric generator 165.

The precision parts include the interface seal 347 and the positioning of stationary outer housing 319 and rotating hub extension 325. Unlike a diesel or Otto engine, the precision machined moving part interfaces are not required in the detonation chamber. The precision machining occurs at interface seal 347, which allow entry of rotating cylinders such as shafts and tubes that must prevent leaking Gases, for example hydrogen and oxygen, enter stationary outer housing 319 and thence to rotating hub extension 325 and rotating shaft 119 or 219. Passages 151-154 route the gasses to detonation chambers 131, 132. To minimize drag at the interface of shaft 119 or 219 and stationary chambers while maintaining a tight seal, low friction materials are used at the interface seal 347. A fluoropolymer material such as polytetrafluoroethylene (PTFE) sold under the trademark TEFLON® by the E.I. du Pont de Nemours and Company of Wilmington, Del. is one possible material to use at this interface, due to its coefficient of friction of 0.04. This is much less than any metal that can be used; however, PTFE would not be suitable for use in combustion regions such as piston rings in a reciprocating engine or detonation chambers 131, 132 in the present configuration. Other low friction materials can be used, including conventional elastomeric seals with lubricants compatible with the fuels and labyrinth seals. It is also possible to provide a dual seal between first and second chambers 321, 322, with an inert pressurized gas injected between the dual seals.

Figure 4:
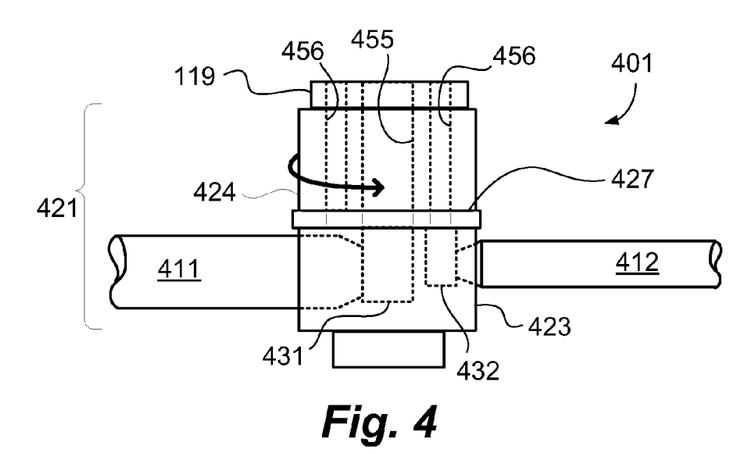
FIG. 4 is a schematic diagram presenting a description of an alternate configuration for the interface between the fuel supply connections and the rotating portion of the engine.

FIG. 4 presents a description of an alternate configuration for an interface coupling 401 which forms a connection between rotating shaft 119 or 219 and an external fuel supply, represented by fuel supply passages 411, 412. Fuel receiving coupling 421 includes stationary coupling part 423 and rotating coupling part 424. Fuel passages 411, 412 pass through a stationary coupling part 423 and connect with center fuel supply passage 431 and annular fuel supply passage 432, respectively. Center fuel supply passage 431 and off-center fuel supply passage 432 terminate at interface seal 427. Fuel receiving coupling 421 may be integral with output bearing hub 117 or may be separate.

Fuel receiving coupling 421 is depicted as separate from hub 117; however, as is the case with the previous example, it is possible to integrate the functions of hub 117 and fuel receiving coupling 421. In the case of fuel receiving coupling 421 being separate from hub 117 as shown, fuel receiving coupling 421 may optionally provide additional physical support for rotating shaft 119 or 219.

In the configuration shown, center fuel supply passage 431 in stationary coupling part 423 aligns with center receiving fuel passage 455 in rotating coupling part 424, while off-center fuel supply passage 432 in stationary coupling part 423 aligns with annular fuel passage 456 in rotating coupling part 424. Rotating coupling part 424 forms a part of rotating shaft 119 or 219 and includes fuel receiving fuel passages 455, 456. Fuel receiving passages 455, 456 are in communication with separate passages 151, 152 or 153, 154 (FIG. 2), in which one of the receiving fuel passages 455 communicates with passages 151 and 153, and the other receiving fuel passage 456 communicates with passages 152 and 154. This arrangement provides separate fuel supplies to detonation chambers 131, 132. In this configuration, the arrangement of fuel supply passage 431 being generally centered, and fuel supply passage 412 being generally off-center arrangement provides a concentric arrangement between fuel supplied from fuel supply passages 411, 412 across interface seal 427.

As another alternative, it is possible to provide separate fuel interfaces for the hydrogen and oxygen by providing fuel connections at top and bottom fuel receiving couplings, located at opposite ends of shaft 119 or 219. The structure of each fuel receiving coupling would be as depicted in FIG. 3; however only a single passage would be present in each of the couplings, and there would be no need for the interface seal 347. As another alternative, it is possible to provide separate but coaxial fuel interfaces for the hydrogen and oxygen by inserting a conduit inside another one of larger radius. This would also allow two individually separate chambers 321, 322.

The gas still under pressure then goes through the passages and to detonation chambers 131, 132. Shaft 119 or 219 at the top of the interface transfers angular momentum from the engine to electric generator 165.

In order to maintain separation between the $H_2$ and $O_2$ gasses, passages 431, 432 and 455, 456 have concentric alignments. It is not necessary that the passages be completely annular, provided that flow is established, and it may be that it is desired to use discontinuities in the annular alignment of at least one of the passages 431, 432, 455, 456 to time flow of the gases to detonation chambers 131, 132. If multiple arms are used, the discontinuities can be used to separately time passage of the gases to the different arms.

The hydrogen and oxygen enter the interface chamber from a container and tube stationary with respect to cylindrical enclosure 111 and passing through passages in the hub, the center shaft and rotating arms. The gases are supplied under pressure that is applied by plungers or other pumping means and is controlled by valves. The pressurized gas flows into a separated chamber that forms the interface between the engine and electric generator 165. Detonation chambers 131, 132 are separated because the hydrogen-oxygen mixture is highly reactive and excessive heat or sparks from internal sensors, electronic check valves etc can ignite the mix. It is safer to mix them just before detonation.

The described techniques provide a pollution-free propulsion system. The detonation releases energy and forms water molecules as a combustion by-product although in order to reduce the possibility of formation of $NO_2$ components in the exhaust, a commercially available device is used to purify air of nitrogen. The water molecules move away from the initial location of detonation and the momentum of the water molecules is transferred into kinetic energy of the arm in its rotation about an axis of shaft 119 or 219. Therefore, a component of conversion of chemical energy released by the detonation of the hydrogen-oxygen mixture is the expansion of the combusted mixture and the transfer of the energy of expansion to detonation chambers 131, 132 and rotating arms 121, 122. The efficiency of the engine is therefore derived from the efficiency of converting the exothermic energy of combustion to momentum, and the transfer of that momentum to detonation chambers 131, 132.

Figure 5:
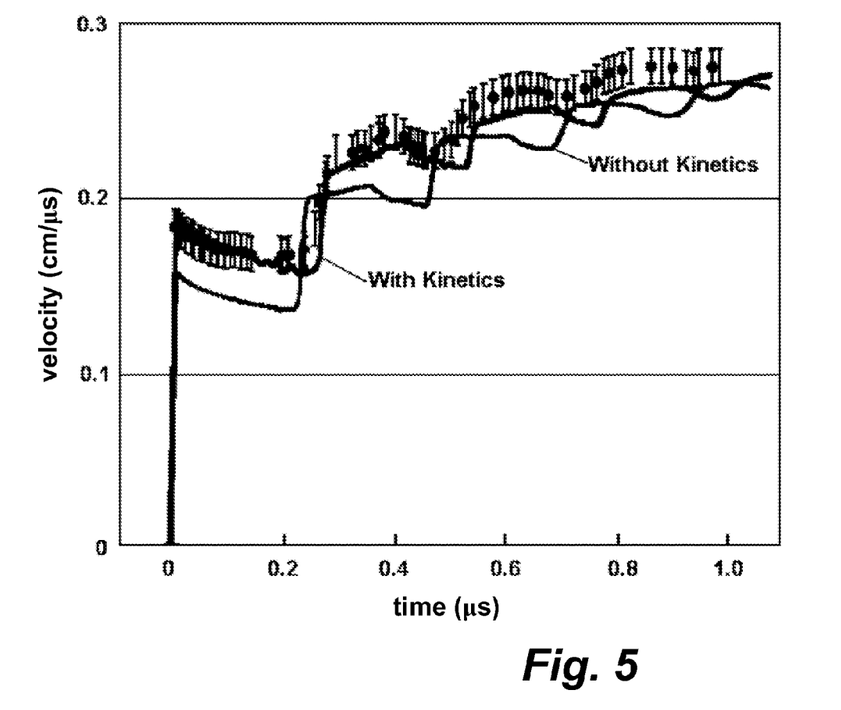
FIG. 5 is a graph showing velocity vs. time of detonated hydrogen and oxygen molecules. The detonation results in the rapid formation of water molecules and the release of significant amounts of energy by the momentum delivered to the molecules.

FIG. 5 is a graph showing velocity vs. time. The smooth line represents acceleration without kinetics of carbon coagulation, and the line showing error bars for data points represents acceleration. This graph presents data on the velocity of water molecules as a function of time after the detonation of hydrogen and oxygen, and is used to show the momentum of the water molecules that is available to be transferred to detonation chambers 131, 132. The graph depicts gas (the water molecules) accelerating to 2820 msec within 1 μsec.

Figure 6:
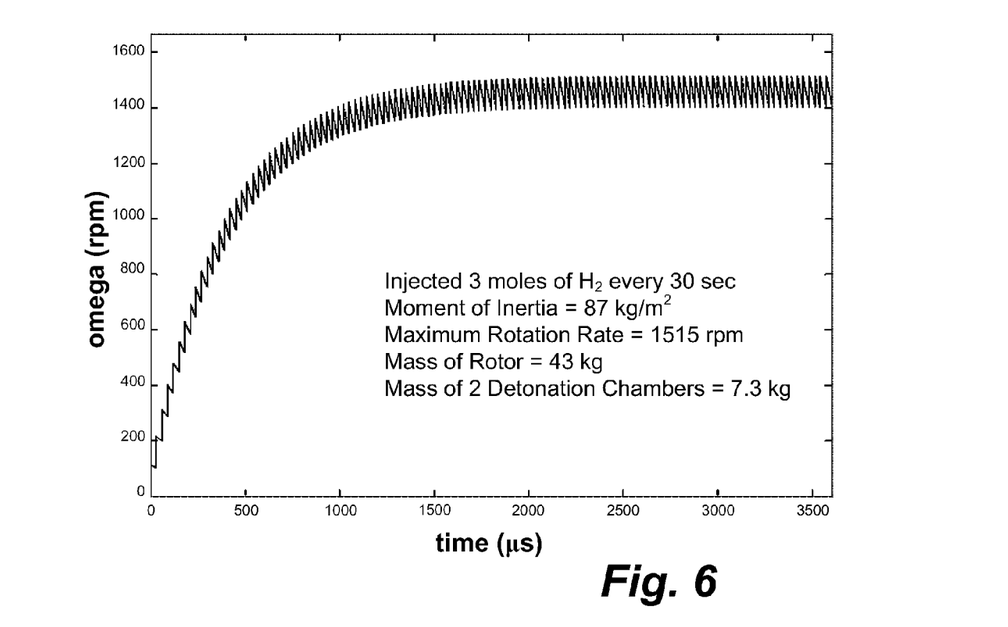
FIGS. 6 and 7 are graphical diagrams showing the results for the rotation rate and power if 3 moles $H_2$ are injected into the engine at intervals of 30 seconds.
Figure 7:
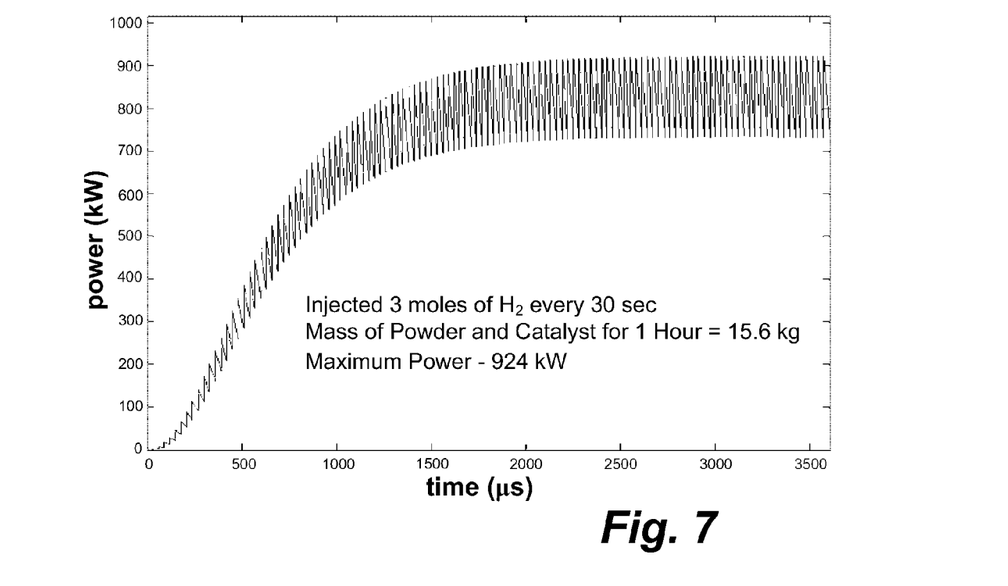

The calculations represented by the graph of FIG. 6 assume that an average of 3 moles $H_2$ are supplied every 30 seconds, for an average rate of 0.1 mole/sec. The average was the minimum that permitted both a maximum rotation speed of near 800 rpm with a maximum power of approximately 800 kW. FIGS. 6 and 7 show the results for the rotation rate and power if 3 moles are injected into the engine at intervals of 30 seconds. The graphs show a sudden increase in the rotation rate due to the detonation, and a slower decrease in the rotation over time due to friction forces. This results in a saw tooth pattern for the rotation rate and power, which can be seen in FIGS. 6 and 7. This decrease in the time interval while still maintaining the time average of injection decreases the amplitude of the sawtooth, and results in a decrease in the total rotation rate and power delivered. Therefore, the total power produced decreases but the production of energy is much smoother by the frequent introduction of small supplies of fuel.

Figure 8:
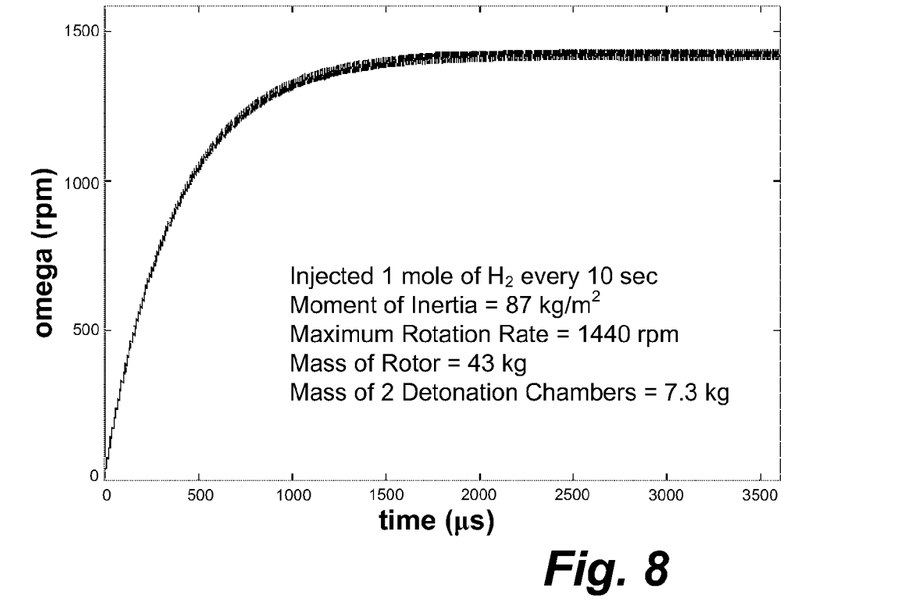
FIGS. 8 and 9 are graphical diagrams showing the results for the rotation rate and power if 1 mole $H_2$ is injected into the engine at intervals of 10 seconds.
Figure 9:
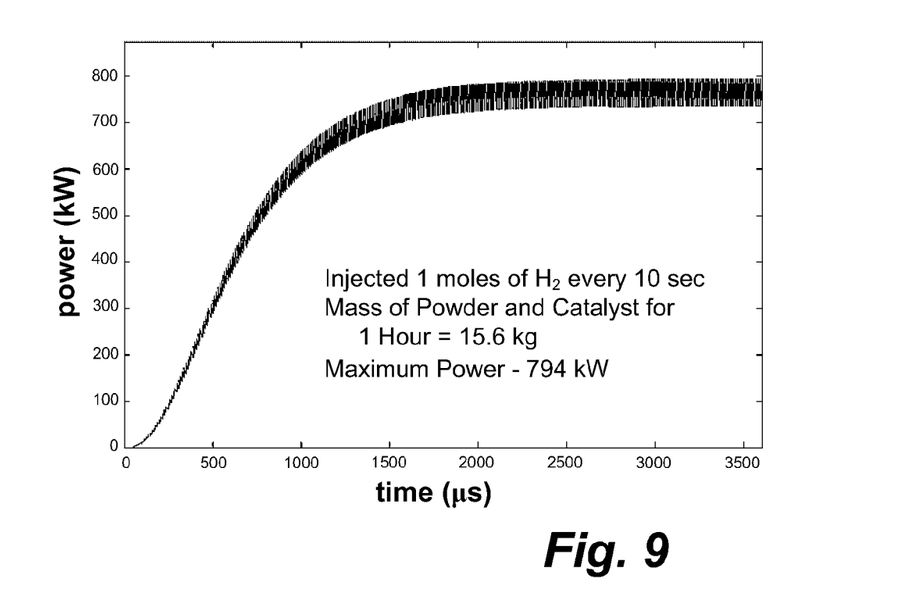

FIGS. 8 and 9 present the data for the case in which 1 mole $H_2$ is injected at intervals of 10 seconds, also providing an average rate of 0.1 mole/sec.

Figure 10:
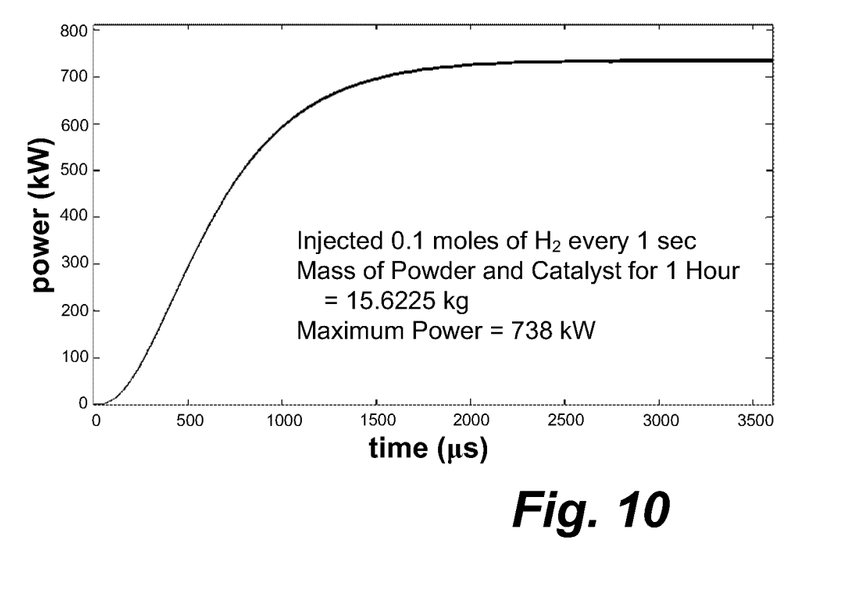
FIG. 10 is a graphical diagram showing the results for power if 0.1 moles $H_2$ are injected into the engine at intervals of 1 second.

Similarly if the time interval between injections is decreased by another factor of 10 the amplitude of the ripple in the rotation and power is barely discernible. FIG. 10 presents data for the rotation rate and power delivered for that case. The maximum power delivered is decreased from 924 kW (for the case of 3 moles every 30 s) to 737 kW (for the case of 0.1 mole every second. The total duration for the use of hydrogen was one hour in these simulations.

Each mole of sodium borohydride powder used to produce the hydrogen from water has a mass of 0.03780 kg. Each mole of powder delivers 4 moles of hydrogen. For a thirty day voyage a total of 2436 kg of powder and 357 kg of catalyst would be needed. The water would be supplied from the outside. Since the density of the powder is 1074 kg/m$^3$, the total volume needed for this substance would be 2.27 m$^3$.

In determining the force supplied by the detonation of hydrogen, a final velocity for water molecules after 1 is of 2820 m/s is assumed. It is also assumed that the water molecules provide the force for 5 is and that only ⅓ (on average) of the water molecules provide thrust by transferring reaction force to detonation chambers 131, 132.

FIG. 5 presents a representation of the velocity of water molecules after the detonation of hydrogen. This is the origin of the number for the velocity of the molecules of 2820 m/s. This is consistent with the velocity of detonation described by Shchelkin, K. I.; Troshin, Ya. K., *Gasdynamics of Detonations*. Mono Book Corp., Baltimore (1965)

Thus, the force delivered by the detonation of moles of hydrogen is given by:

$$F_H = a(\tfrac{1}{3}) N_A M_{wat} dv/dt \quad \text{(equation 1)}$$

The symbol $N_A$ stands for Avogadro's number (6.02×10$^{23}$). The mass of the water molecule, $M_{wat}$ is approximately 18×1.67×10$^{-27}$ kg. It is assumed that the detonation lasts for 5×10$^{-6}$ sec. We define this time duration by Δ. Thus, the force provided by a quantity of moles of hydrogen is given by:

$$F_H = a1.69 \times 10^7 N \quad \text{(equation 2)}$$

The equation of motion for the rotor with the forcing function caused by the detonation of hydrogen is given by:

$$I d\omega/dt = 2 F_H D/2 - \text{Torque due to drag} \quad \text{(equation 3)}$$

The quantity, ω, is the rotation rate of the rotor. The torque is caused by the drag produced by friction at the interface of the rotor with cylindrical enclosure 111. This term is also proportional to the square of the rotation rate, ω due to the dependence of the centrifugal force which is the source of the frictional force. By properly balancing the rotor and using such a material as Teflon for the interface, this frictional force can be made small. A vacuum pump is used to evacuate the hydrogen engine. The pump, in addition to removing the byproducts of combustion (water vapor), also reduces drag due to air resistance.

The total time in which the hydrogen is operating is divided into N periods of duration τ. Each period, τ, is in turn divided into two regions, corresponding to the time in which the detonation of hydrogen is increasing the rotation rate and the time in which no hydrogen is being added. After a time (n−1)τ the rotation rate is assumed to be ω(n−1). The rate of change of the rotation rate is given by:

$$Id\omega/dt = aF_H D - T\omega^2 \text{ for } (n-1)\tau \leq t \leq (n-1)\tau + \Delta$$

for Phase 1 and $$n=1,2,3,\ldots N/\tau \quad \text{(equation 4)}$$

For the period in which no hydrogen is being added, the rate of change of the angular velocity is given by:

$$Id\omega/dt = -T\omega^2 \text{ for } (n-1)\tau + \Delta \leq t \leq n\tau \quad \text{(equation 5)}$$

for Phase 2 and $$n=1,2,3,\ldots n/\tau \quad \text{(equation 5)}$$

At the beginning of phase 1 the angular velocity is assumed to be given by $$\omega(t=(n-1)\tau) = \omega(n-1) \quad \text{(equation 6)}$$

At the end of phase 1 the angular velocity is given by $$\omega(t=(n-1)\tau+\Delta) = \omega(n-1)^{(+)} \quad \text{(equation 7)}$$

The relation between ω(n−1) and ω(n−1)$^{(+)}$ is obtained by solving equation 8. The result is:

$$\omega(n-1)^{(+)} = \sqrt{(aF_H D/I)}[-1+\{\sqrt{(aF_H D)}+\omega(n-1)\sqrt{T}\}\exp((2\Delta/I)\sqrt{(aF_H DT)})/\{\sqrt{(aF_H D)}-\omega(n-1)\sqrt{T}\}]/[1+\{\sqrt{(aF_H D)}+\omega(n-1)\sqrt{T}\}\exp((2\Delta/I)\sqrt{(aF_H DT)})/\{\sqrt{(aF_H D)}-\omega(n-1)\sqrt{T}\}] \quad \text{(equation 8)}$$

For phase 2 in which a=0 the result is:

$$\omega(n) = \omega(n-1)^{(+)}/(1+\omega(n-1)^{(+)}\tau T/I) \quad \text{(equation 9)}$$

In an example configuration, a quantity of fuel to operate an 800 kW prime mover on a submarine was calculated. The initial condition is that the rotation rate starts at zero. The power generated is given by the product of the torque and the rotational velocity. The torque is given by the right hand side of equation 5. The results are comparable to 800 kW needed for the submarine. The final result is presented in FIG. 8 when 0.1 moles $H_2$ are injected each second. The total mass of the hydrogen generator is less than 55 kg, with a volume of approximately 2.5 m³. Much of the volume is evacuated space, because air and water is evacuated from chamber 111. The mass for the fuel to last 30 days of continuous operation is 2500 kg in a volume of 2.27 m³, which is significantly less than the diesel fuel needed for this length of operation.

While a single pair of rotating arms has been described, it is possible to provide different configurations of multiple arms. The timing of detonations can be such that a set of detonation chambers on each arm are simultaneously fired so that their moments of force about the center shaft are balanced. The simultaneous firing is advantageous because the engine does not use an offset crankshaft. It is nevertheless possible to provide more than one set of detonation chambers, in which the sets are each balanced. The timing of detonations may be achieved by an ignition source such as a spark plug, but it is also possible to time the flow of the hydrogen and oxygen so as to optimize the concentration of the fuel gasses in the detonation chambers.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A prime mover comprising:
   a center hub;
   a center shaft rotably mounted to the center hub;
   one or more rotating arms mounted to the center shaft;
   a detonation chamber mounted to each rotating arm, positioned on the arms at a distance from the center hub which establishes a force moment about the center hub;
   a set of fuel passages connecting an external fuel source with the center hub;
   corresponding sets of fuel passages connecting the center hub to the detonation chambers;
   a fuel interface including a rotating hub extension at the center hub connecting the fuel passages from the external fuel source with corresponding fuel passages connecting the center hub to the detonation chambers, to deliver and maintain communication of fuel to the detonation chambers during rotation of the rotating hub extension;
   an ignition source timed to cause detonation of the fuel delivered to the detonation chambers; and
   the rotating arms mounted to the center hub in a manner that balances moments of force about the center hub exerted by the rotating arms during rotation of the swing rotating arms.

2. The prime mover of claim 1, wherein one of the fuel passages delivers hydrogen as the external fuel source, and the other fuel passage provides oxygen as the external fuel source.

3. The prime mover of claim 1, wherein the rotating arms and the detonation chambers form one or more balanced sets, in which moments established by the detonation chambers and rotating arms balance each other within each set, and the detonation of fuel from each of the chambers balances with detonation of fuel from other detonation chambers within the respective sets.

4. The prime mover of claim 3, further comprising a hydrogen source produced by a reaction of sodium borohydride and water in the presence of a catalyst.

5. The prime mover of claim 4, further comprising a sea water intake capable of mixing water with the sodium borohydride in the presence of a catalyst.

6. The prime mover of claim 1, further comprising a generator output.

7. The prime mover of claim 1, the rotating hub extension comprising:
   a fuel receiving interface coupling connecting the external fuel sources with the center shaft, the fuel receiving interface having first and second chambers;
   a rotating part of the fuel interface coupling having a fixed relationship to the center shaft;
   a stationary part of the fuel interface coupling, positioned in an axial alignment with the rotating part but maintaining a stationary position with the rotating part rotating with respect to the stationary part, with the first and second chambers in communication with the stationary part and the rotating part;

an interface seal separating the first and second chambers, and engaging the rotating part and the stationary part, the interface seal having sliding relationship with at least one of the rotating part and the stationary part as a rotating seal, whereby the stationary part, the rotating part and the interface seal establish the first and second chambers; and a set of fuel passages connecting an external fuel source with respective ones of the first and second chambers, and the first and second chambers connecting with respective ones of the corresponding sets of fuel passages so as to connect the center hub to the detonation chambers.

8. A method of providing motive force, the method comprising:

providing one or more rotating arms mounted to a center shaft, with a detonation chamber mounted to each rotating arm, positioned on the arms at a distance from the center hub which establishes a force moment about the center hub;

providing and continuously maintaining communication of fuel to the detonation chambers through two sets of fuel passages connecting an external fuel source with the detonation chambers through the center hub, to deliver and continuously maintain communication of fuel to the detonation chambers; and providing ignition timed to cause detonation of the fuel delivered to the detonation chambers, wherein the rotating arms and detonation chambers provide a balanced set of moments about the center hub the rotating arms having a mounted to the center hub in a manner that balances moments of force about the center hub exerted by the rotating arms during rotation of the swing rotating arms.

9. The method of claim 8, further comprising delivering hydrogen and oxygen in separate fuel passages as the fuel from the external fuel source.

10. The method of claim 8, further comprising providing the rotating arms and the detonation chambers as one or more balanced sets, in which moments established by the detonation chambers and rotating arms balance each other within each set, and the detonation of fuel from each of the chambers balances with detonation of fuel from other detonation chambers within the respective sets.

11. The method of claim 10, further wherein the fuel provided by the external fuel source comprises hydrogen produced by the external fuel source by a reaction of sodium borohydride and water in the presence of a catalyst.

12. The prime mover of claim 11, wherein the external fuel source mixes sea water from a sea water intake with the sodium borohydride in the presence of a catalyst to produce the hydrogen.

13. The method of claim 8, further comprising using the motive force to power an electric generator.

* * * * *